(12) United States Patent
Kawai et al.

(10) Patent No.: US 11,411,241 B2
(45) Date of Patent: Aug. 9, 2022

(54) SECONDARY BATTERY

(71) Applicant: Murata Manufacturing Co., Ltd., Nagaokakyo (JP)

(72) Inventors: Toru Kawai, Nagaokakyo (JP); Masahiro Otsuka, Nagaokakyo (JP); Yuji Mizuguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/434,353

(22) Filed: Jun. 7, 2019

(65) Prior Publication Data
US 2019/0305353 A1    Oct. 3, 2019

Related U.S. Application Data

(63) Continuation of application No. PCT/JP2017/045558, filed on Dec. 19, 2017.

(30) Foreign Application Priority Data

Jan. 12, 2017 (JP) .............................. JP2017-003629

(51) Int. Cl.
*H01M 10/04* (2006.01)
*H01M 10/44* (2006.01)
(Continued)

(52) U.S. Cl.
CPC ....... *H01M 10/0431* (2013.01); *H01M 10/04* (2013.01); *H01M 10/045* (2013.01);
(Continued)

(58) Field of Classification Search
CPC ............. H01M 10/0431; H01M 10/04; H01M 10/0418; H01M 10/045; H01M 10/0525;
(Continued)

(56) References Cited

U.S. PATENT DOCUMENTS 8,491,673 B2   7/2013  Daidoji et al.
8,945,744 B2   2/2015  Kwon et al.
(Continued)

FOREIGN PATENT DOCUMENTS

CN   1830114 A    9/2006
CN   104303332 A  1/2015
(Continued)

OTHER PUBLICATIONS

International Search Report issued in PCT/JP2017/045558, dated Mar. 13, 2018.
(Continued)

*Primary Examiner* — Cynthia H Kelly
*Assistant Examiner* — Jenna Shulman
(74) *Attorney, Agent, or Firm* — ArentFox Schiff LLP

(57) ABSTRACT

A secondary battery in which an electrode assembly including positive electrodes, negative electrodes, and separators disposed between the positive electrodes and the negative electrodes, and an electrolyte are housed in an exterior body. The electrode assembly has a step structure including a first region having a relatively high cross-sectional height and a second region having a relatively low cross-sectional height adjacent to the first region. The electrode assembly includes at least one of a positive electrode side connecting portion and a negative electrode side connecting portion in the first region. At least one of a positive electrode side extended portion and a negative electrode side extended portion in the second region is configured to be electrically connected to an external terminal.

17 Claims, 6 Drawing Sheets

(51) Int. Cl.
    *H01M 10/0587* (2010.01)
    *H01M 10/0525* (2010.01)
    *H01M 10/0585* (2010.01)
    *H01M 50/10* (2021.01)
    *H01M 50/531* (2021.01)

(52) U.S. Cl.
    CPC ... *H01M 10/0418* (2013.01); *H01M 10/0525* (2013.01); *H01M 10/0585* (2013.01); *H01M 10/0587* (2013.01); *H01M 10/44* (2013.01); *H01M 50/10* (2021.01); *H01M 50/531* (2021.01); *Y02E 60/10* (2013.01); *Y02T 10/70* (2013.01)

(58) Field of Classification Search
    CPC ......... H01M 10/0585; H01M 10/0587; H01M 10/44; H01M 50/10; H01M 50/531; Y02E 60/10; Y02T 10/70
    See application file for complete search history.

(56) References Cited

U.S. PATENT DOCUMENTS

| | | | |
|---|---|---|---|
| 9,548,475 | B2 | 1/2017 | Kang et al. |
| 9,660,296 | B2 | 5/2017 | Kim et al. |
| 9,865,861 | B2 | 1/2018 | Kim |
| 2006/0188777 | A1 | 8/2006 | Kaneta |
| 2008/0060189 | A1 | 3/2008 | Daidoji et al. |
| 2014/0011070 | A1 | 1/2014 | Kim et al. |
| 2014/0087224 | A1 | 3/2014 | Kim et al. |
| 2014/0099525 | A1 | 4/2014 | Kwon et al. |
| 2014/0120406 | A1 | 5/2014 | Kim et al. |
| 2015/0037664 | A1 | 2/2015 | Kang et al. |
| 2015/0221988 | A1* | 8/2015 | Kwon ............... H01M 10/0585 429/94 |
| 2015/0340733 | A1 | 11/2015 | Kwon et al. |
| 2015/0372353 | A1 | 12/2015 | Ryu et al. |

FOREIGN PATENT DOCUMENTS

| | | |
|---|---|---|
| CN | 104885255 A | 9/2015 |
| JP | H0359954 A | 3/1991 |
| JP | 2008066170 A | 3/2008 |
| JP | 2014521197 A | 8/2014 |
| JP | 2014523629 A | 9/2014 |
| JP | 2014526133 A | 10/2014 |
| JP | 2015115261 A | 6/2015 |
| JP | 2015518256 A | 6/2015 |
| JP | 2016502743 A | 1/2016 |

OTHER PUBLICATIONS

Written Opinion from the International Searching Authority issued in PCT/JP2017/045558, dated Mar. 13, 2018.
Chinese Office Action issued for Chinese Application No. 201780081680.6, dated Jul. 21, 2021.

* cited by examiner

SECONDARY BATTERY

CROSS REFERENCE TO RELATED APPLICATIONS

The present application is a continuation of International application No. PCT/JP2017/045558, filed Dec. 19, 2017, which claims priority to Japanese Patent Application No. 2017-003629, filed Jan. 12, 2017, the entire contents of each of which are incorporated herein by reference.

FIELD OF THE INVENTION

The present invention relates to a secondary battery.

BACKGROUND OF THE INVENTION

Secondary batteries that can be repeatedly charged and discharged have conventionally been used for various purposes. For example, a secondary battery is used as a power source for electronic equipment, such as a smartphone and a notebook computer.

In recent years, there has been a growing demand for thinner and smaller electronic equipment, and along with this, there has been a demand for efficient provision of a substrate and the like in secondary batteries in electronic equipment. With respect to this, Patent Document 1 discloses a secondary battery having a step structure. More specifically, Patent Document 1 discloses that an electrode assembly including a positive electrode, a negative electrode, and a separator disposed between the positive electrode and the negative electrode, which are constituents of the secondary battery, forms a step structure in a cross-sectional view.

Patent Document 1: Japanese Unexamined Patent Application Publication (Translation of PCT Application) No. 2014-523629

SUMMARY OF THE INVENTION

Here, the inventors of the present application have found that a problem described below may occur when a secondary battery including an electrode assembly having a step structure in a cross-sectional view is used. Specifically, the inventors of the present invention have found that when an electrode assembly having a step structure in a cross-sectional view is used, each positive electrode and each negative electrode as its constituents need to be electrically connected, which causes a restriction on an installation location of an external terminal.

The present invention has been devised in view of such circumstances. Specifically, it is an object of the present invention to provide a secondary battery in which a restriction on an installation location of an external terminal can be avoided.

In order to achieve the above object, according to one embodiment of the present invention, there is provided a secondary battery in which an electrode assembly including positive electrodes, negative electrodes, and separators disposed between the positive electrodes and the negative electrodes, and an electrolyte are housed in an exterior body.

The electrode assembly is configured to have a step structure including a first region with a relatively high cross-sectional height and a second region with a relatively low cross-sectional height adjacent to the first region.

The electrode assembly includes at least one of a positive electrode side connecting portion that mutually connects each of positive electrode side connecting tabs of part of the positive electrodes in the first region and a negative electrode side connecting portion that mutually connects each of negative electrode side connecting tabs of part of the negative electrodes in the first region.

At least one of a positive electrode side extended portion mutually connecting each of positive electrode side extended tabs of at least two of the positive electrodes and a negative electrode extended portion mutually connecting each of negative electrode side extended tabs of at least two of the negative electrodes in the second region is configured to be electrically connected to an external terminal.

According to the present invention, it is possible to avoid a restriction on an installation location of an external terminal.

DETAILED DESCRIPTION OF THE INVENTION

Hereinafter, before a secondary battery according to an embodiment of the present invention is described, a basic configuration of a secondary battery will be described.

[Basic Configuration of Secondary Battery]

Figure 9:
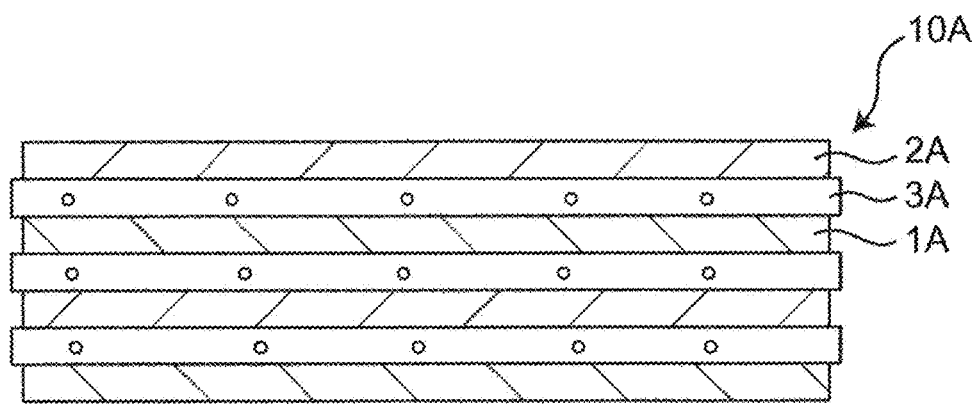
FIG. 9 is a cross-sectional view schematically showing a basic configuration of an electrode assembly having a planar lamination structure.
Figure 10:
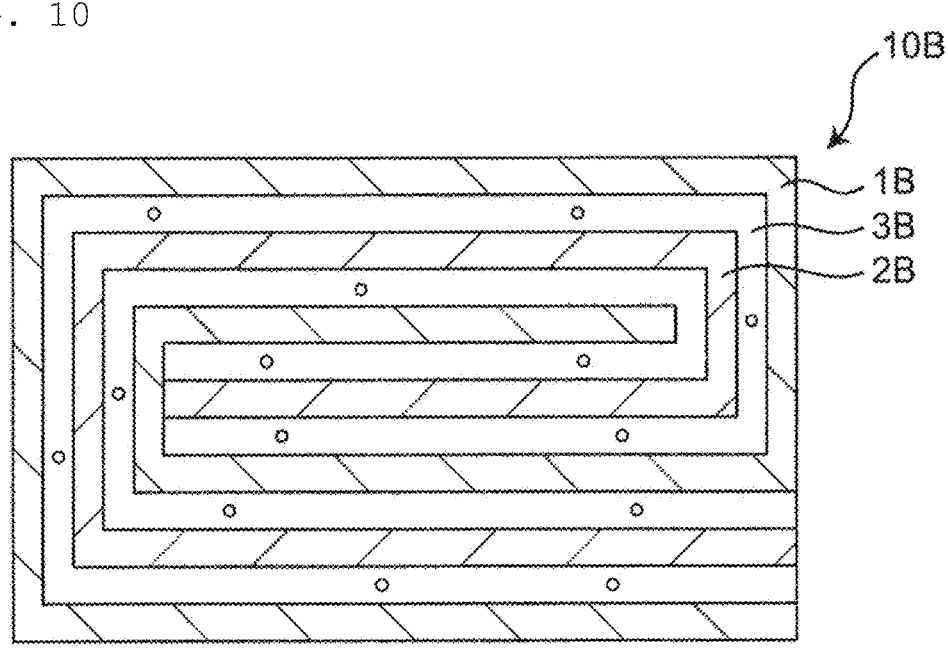
FIG. 10 is a cross-sectional view schematically showing a basic configuration of an electrode assembly having a wound structure.

The secondary battery has a structure in which an electrode assembly and an electrolyte are accommodated and enclosed in an exterior body as described in an embodiment of the present invention below. In the present description, the term "secondary battery" refers to a battery that can be repeatedly charged and discharged. Therefore, the secondary battery of the present invention is not excessively bound by its name, and for example, "electric storage device" and the like may be included in the subject of the present invention. The electrode assembly includes a positive electrode, a negative electrode, and a separator disposed between the positive electrode and the negative electrode. Types of the electrode assembly include those described below. In a first type, an electrode assembly 10A has a planar lamination structure, in which a plurality of unit electrode units including positive electrodes 1, 1A, negative electrodes 2, 2A, and separators 3, 3A are laminated (see FIG. 9). In a second type, an electrode assembly 10B has a wound structure in which electrode units including positive electrodes 1, 1B, negative electrodes 2, 2B, and separators 3, 3B are wound in a roll (see FIG. 10). Furthermore, as a third type, the electrode assembly may have what is called a stack-and-fold structure that is formed by folding an electrode unit of a positive electrode, a negative electrode, a separator, and a negative electrode (particularly preferably an electrode unit (a laminate body) extending longer in one direction). Further, the exterior body may take a form of a conductive hard case or a flexible case (such as a pouch). When the form of the exterior body is a flexible case (such as a pouch), each of a plurality of positive electrodes is connected to the positive electrode external terminal with a positive electrode current collector lead interposed between them. The positive electrode external terminal is fixed to the exterior body by a seal portion, and the seal portion prevents leakage of the electrolyte. Similarly, each of a plurality of negative electrodes is connected to a negative terminal external terminal with a negative electrode current collector lead interposed between them. The negative terminal external terminal is fixed to the exterior body by a seal portion, and the seal portion prevents leakage of the electrolyte. The positive electrode current collector lead connected to each of a plurality of positive electrodes may have a function of the positive electrode external terminal, and the negative electrode current collector lead connected to each of a plurality of negative electrodes may have a function of the negative terminal external terminal. When the form of the exterior body is a conductive hard case, each of a plurality of positive electrodes is connected to the positive electrode external terminal with a positive electrode current collector lead interposed between them. The positive electrode external terminal is fixed to the exterior body by a seal portion, and the seal portion prevents leakage of the electrolyte.

Figure 11:
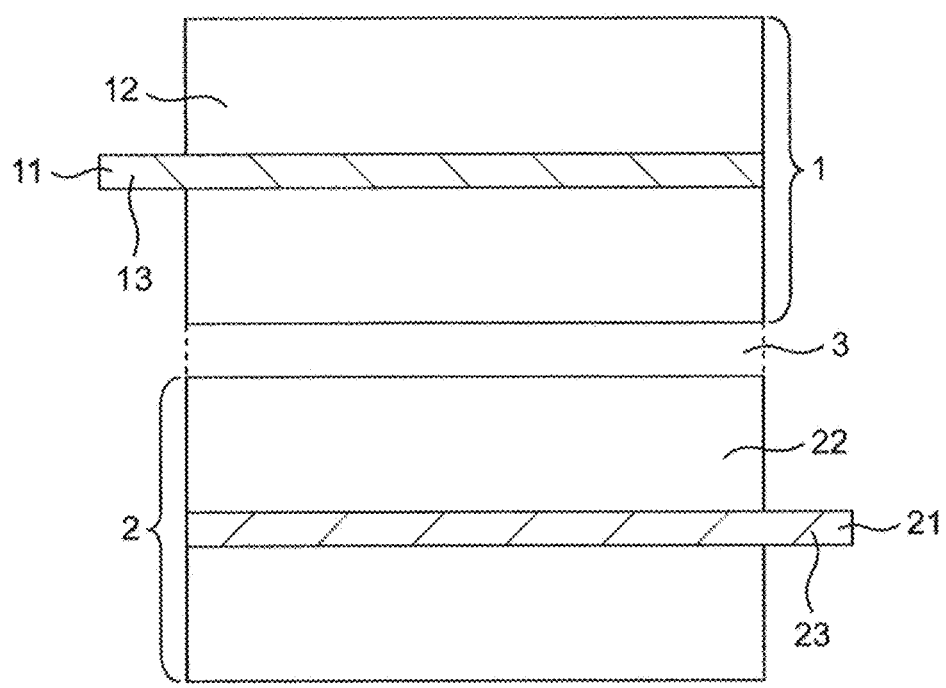
FIG. 11 is a cross-sectional view schematically showing a specific configuration of the electrode assembly.

A positive electrode 1 is configured with at least a positive electrode current collector 11 and a positive electrode material layer 12 (see FIG. 11), and the positive electrode material layer 12 is provided on at least one side of the positive electrode current collector 11. In a location of the positive electrode current collector 11 where the positive electrode material layer 12 is not provided, that is, an end portion of the positive electrode current collector 11, a positive electrode side extended tab 13 is positioned. The positive electrode material layer 12 contains a positive electrode active material as an electrode active material. A negative electrode 2 is configured with at least a negative electrode current collector 21 and a negative electrode material layer 22 (see FIG. 11), and the negative electrode material layer 22 is provided on at least one side of the negative electrode current collector 21. In a location of the negative electrode current collector 21 where the negative electrode material layer 22 is not provided, that is, an end portion of the negative electrode current collector 21, a negative electrode side extended tab 23 is positioned. The negative electrode material layer 22 contains a negative electrode active material as an electrode active material.

The positive electrode active material contained in the positive electrode material layer 12 and the negative electrode active material contained in the negative electrode material layer 22 are substances directly involved in the transfer of electrons in the secondary battery, and are main substances of the positive and negative electrodes which are responsible for charging and discharging, that is, cell reaction. More specifically, ions are brought in an electrolyte due to "the positive electrode active material contained in the positive electrode material layer 12" and "the negative electrode active material contained in the negative electrode material layer 22", and such ions move between the positive electrode 1 and the negative electrode 2 so that electrons are transferred, and charging and discharging are performed. The positive electrode material layer 12 and the negative electrode material layer 22 are preferably layers particularly capable of occluding and releasing lithium ions. That is, the secondary battery, in which lithium ions move between the positive electrode 1 and the negative electrode 2 through an electrolyte to charge and discharge the battery, is preferable. When lithium ions are involved in charging and discharging, the secondary battery corresponds to what is called a "lithium ion battery".

The positive electrode active material of the positive electrode material layer 12 is made of, for example, a granular body, and a binder (which is also referred to as a "binding material") is preferably included in the positive electrode material layer 12 for the grains to be in contact with each other sufficiently and to retain a shape. Furthermore, a conductive auxiliary agent may be included in the positive electrode material layer 12 in order to facilitate transmission of electrons promoting a cell reaction. Likewise, the negative electrode active material of the negative electrode material layer 22 is made of, for example, a granular body, and a binder is preferably included for the grains to be in contact with each other sufficiently and to retain a shape, and a conductive auxiliary agent may be included in the negative electrode material layer 22 in order to facilitate transmission of electrons promoting a cell reaction. As described above, since a plurality of components are contained, the positive electrode material layer 12 and the negative electrode material layer 22 can also be referred to as a "positive electrode mixture layer" and a "negative electrode mixture layer", respectively.

The positive electrode active material is preferably a substance that contributes to occlusion and releasing of lithium ions. In this respect, it is preferable that the positive electrode active material be, for example, a lithium-containing composite oxide. More specifically, it is preferable that the positive electrode active material be a lithium transition metal composite oxide containing lithium and at least one kind of transition metal selected from a group consisting of cobalt, nickel, manganese, and iron. That is, in the positive electrode material layer 12 of the secondary battery, such a lithium transition metal composite oxide is preferably included as a positive electrode active material. For example, the positive electrode active material may be lithium cobalt oxide, lithium nickel oxide, lithium manganate, lithium iron phosphate, or part of their transition metals replaced with another metal. Although one kind of such a positive electrode active material may be included, two or more kinds of such a positive electrode active material may also be contained in combination. In a more preferable mode, the positive electrode active material contained in the positive electrode material layer 12 is lithium cobalt oxide.

The binder which may be contained in the positive electrode material layer 12 is not particularly limited, and can be at least one kind selected from a group consisting of polyvinylidene fluoride, vinylidene fluoride-hexafluoropropylene copolymer, vinylidene fluoride-tetrafluoroethylene copolymer, and polytetrafluoroethylene. The conductive auxiliary agent which may be contained in the positive electrode material layer 12 is not particularly limited, and can be at least one kind selected from carbon black, such as thermal black, furnace black, channel black, ketjen black, acetylene black, and the like, graphite, a carbon fiber, such as carbon nanotube and vapor phase growth carbon fiber, metal powder of copper, nickel, aluminum, silver, and the like, polyphenylene derivative, and the like. For example, the binder of the positive electrode material layer 12 may be polyvinylidene fluoride. Although it is merely an example, the conductive auxiliary agent of the positive electrode material layer 12 is carbon black. In a more preferably mode, the binder and the conductive auxiliary agent of the positive electrode material layer 12 may be a combination of polyvinylidene fluoride and carbon black.

The negative electrode active material is preferably a substance that contributes to occlusion and releasing of lithium ions. In this respect, it is preferable that the negative electrode active material be, for example, various carbon materials, oxides or lithium alloys.

As the various carbon materials of the negative electrode active material, graphite (natural graphite, artificial graphite), hard carbon, soft carbon, diamond-like carbon, and the like can be mentioned. In particular, graphite is preferable because it has high electron conductivity and excellent adhesion to the negative electrode current collector 21. As the oxide of the negative electrode active material, at least one kind selected from a group consisting of silicon oxide, tin oxide, indium oxide, zinc oxide, lithium oxide, and the like can be mentioned. The lithium alloy of the negative electrode active material may be any metal which may be alloyed with lithium, and is preferably, for example, a binary, ternary or higher alloy of a metal, such as Al, Si, Pb, Sn, In, Bi, Ag, Ba, Ca, Hg, Pd, Pt, Te, Zn, La, and the like, and lithium. It is preferable that such an oxide be amorphous as its structural form. This is because degradation due to nonuniformity, such as crystal grain boundaries or defects, is hardly generated. Although it is merely an example, the negative electrode active material of the negative electrode material layer 22 may be artificial graphite.

The binder which may be contained in the negative electrode material layer 22 is not particularly limited, and can be at least one kind selected from a group consisting of styrene butadiene rubber, polyacrylic acid, polyvinylidene fluoride, polyimide resin, and polyamide imide resin. For example, the binder contained in the negative electrode material layer 22 may be styrene butadiene rubber. The conductive auxiliary agent which may be contained in the negative electrode material layer 22 is not particularly limited, and can be at least one kind selected from carbon black, such as thermal black, furnace black, channel black, ketjen black, acetylene black, and the like, graphite, a carbon fiber, such as carbon nanotube and vapor phase growth carbon fiber, metal powder of copper, nickel, aluminum, silver, and the like, polyphenylene derivative, and the like. Note that the negative electrode material layer 22 may contain a component derived from a thickener component (for example, carboxymethyl cellulose) used at the time of manufacturing a battery.

Although it is merely an example, the negative electrode active material and the binder in the negative electrode material layer 22 may be a combination of artificial graphite and styrene butadiene rubber.

The positive electrode current collector 11 and the negative electrode current collector 21 used for the positive electrode 1 and the negative electrode 2 are members that contribute to collecting and supplying electrons generated in the active material due to a cell reaction. Such a current collector may be a sheet-like metal member and may have a porous or perforated form. For example, the current collector may be a metal foil, a punching metal, a net, an expanded metal, or the like. The positive electrode current collector 11 used for the positive electrode 1 is preferably made from a metal foil containing at least one kind selected from a group consisting of aluminum, stainless steel, nickel, and the like, and may be, for example, an aluminum foil. On the other hand, the negative electrode current collector 21 used for the negative electrode 2 is preferably made from a metal foil containing at least one kind selected from a group consisting of copper, stainless steel, nickel, and the like, and may be, for example, a copper foil.

The separator 3 used for the positive electrode 1 and the negative electrode 2 is a member provided for the prevention of a short circuit due to contact of the positive and negative electrodes, holding of the electrolyte, and the like. In other words, the separator 3 can be considered as a member that allows ions to pass through while preventing electronic contact between the positive electrode 1 and the negative electrode 2. Preferably, the separator 3 is a porous or microporous insulating member and has a film form due to its small thickness. Although it is merely an example, a microporous film made from polyolefin may be used as the separator. In this regard, the microporous film used as the separator 3 may contain, for example, only polyethylene (PE) or polypropylene (PP) as polyolefin. Furthermore, the separator 3 may be a laminate body configured with a "microporous film made from PE" and a "microporous film made from PP". A surface of the separator 3 may be covered with an inorganic particle coat layer, and/or an adhesive layer, or the like. The surface of the separator may have adhesive properties. Note that, the separator 3 should not be particularly restricted by its name, and may be a solid electrolyte, a gel electrolyte, an insulating inorganic particle, or the like having a similar function. Note that, from the viewpoint of further improving the handling of the electrode, the separator 3 and the electrode (the positive electrode 1/the negative electrode 2) are preferably adhered. The adhesion between the separator 3 and the electrode may be performed by using an adhesive separator as the separator 3, applying an adhesive binder on the electrode material layer (the positive electrode material layer 12/the negative electrode material layer 22), and/or thermocompression bonding, and the like. Examples of the adhesive agent that provides adhesiveness to the separator 3 or the electrode material layer include polyvinylidene fluoride, an acrylic adhesive, and the like.

When the positive electrode 1 and the negative electrode 2 have a layer capable of occluding and releasing lithium ions, the electrolyte is preferably a "non-aqueous" electrolyte, such as an organic electrolyte and/or an organic solvent (that is, the electrolyte is preferably a non-aqueous electrolyte). In the electrolyte, metal ions released from the electrode (the positive electrode 1 or the negative electrode 2) exist, and hence the electrolyte helps transfer of metal ions in the cell reaction.

The non-aqueous electrolyte is an electrolyte containing a solvent and a solute. A specific solvent of the non-aqueous electrolyte preferably include at least a carbonate. Such a carbonate may be cyclic carbonates and/or chain carbonates. Although not particularly limited, as the cyclic carbonates, at least one selected from a group consisting of propylene carbonate (PC), ethylene carbonate (EC), butylene carbonate (BC), and vinylene carbonate (VC) can be mentioned. As the chain carbonates, at least one selected from the group consisting of dimethyl carbonate (DMC), diethyl carbonate (DEC), ethyl methyl carbonate (EMC) and dipropyl carbonate (DPC) can be mentioned. Although it is merely an example, a combination of cyclic carbonates and chain carbonates may be used as the non-aqueous electrolyte, and, for example, a mixture of ethylene carbonate and diethyl carbonate may be used. Further, as a specific solute of the non-aqueous electrolyte, for example, a Li salt, such as $LiPF_6$, $LiBF_4$, or the like is used. Further, as a specific solute of the non-aqueous electrolyte, for example, a Li salt, such as $LiPF_6$ and/or $LiBF_4$, is preferably used.

As the positive electrode current collector lead and the negative electrode current collector lead, any current collector lead used in the field of the secondary battery can be used. Such a current collector lead is preferably made from a material by which electron transfer may be performed, and is made from, for example, a conductive material, such as aluminum, nickel, iron, copper, stainless steel, or the like. The positive electrode current collector lead is preferably made from aluminum and the negative electrode current collector lead is preferably made from nickel. The form of the positive electrode current collector lead and the negative electrode current collector lead is not particularly limited, and may be, for example, a line or a plate shape.

Any external terminal used in the field of secondary batteries can be used as the external terminal. Such an external terminal is preferably made from a material by which electron transfer may be performed, and is normally made from a conductive material, such as aluminum, nickel, iron, copper, stainless steel, or the like. An external terminal 5 may be electrically and directly connected to a substrate, or may be electrically and indirectly connected to the substrate with another device interposed between them. Note that the configuration is not limited to the above, and the positive electrode current collector lead electrically connected to each of a plurality of positive electrodes may have a function of the positive electrode external terminal, and the negative electrode current collector lead electrically connected to each of a plurality of negative electrodes may have a function of the negative terminal external terminal.

The exterior body may be in the form of a conductive hard case or a flexible case (such as a pouch) as described above.

The conductive hard case is composed of a main body portion and a lid portion. The main body portion is composed of a bottom portion and a side portion constituting a bottom surface of the exterior body. The main body portion and the lid portion are sealed after the electrode assembly, the electrolyte, the current collector lead and the external terminal are accommodated. The sealing method is not particularly limited, and for example, a laser irradiation method or the like can be mentioned. As a material constituting the main body portion and the lid portion, any material which may constitute a hard case type exterior body in the field of secondary batteries can be used. Such a material may be any material as long as electron transfer can be performed, and examples of such a material include conductive materials such as aluminum, nickel, iron, copper, and stainless steel. Dimensions of the main body portion and the lid portion are mainly determined according to dimensions of the electrode assembly, and are preferably such that, for example, movement (displacement) of the electrode assembly in the exterior body is prevented when the electrode assembly is accommodated. By preventing movement of the electrode assembly, destruction of the electrode assembly is prevented and the safety of the secondary battery is improved.

The flexible case is composed of a flexible sheet. The flexible sheet is preferably as soft as allowing the seal portion to be bent, and is preferably a plastic sheet. The plastic sheet is a sheet having such a characteristic that deformation by an external force is maintained when the external force is applied and then removed, and for example, what is called a laminate film can be used as the plastic sheet. For example, a flexible pouch made from a laminate film can be manufactured by laminating two laminate films and heat-sealing a peripheral portion of the laminate films. As the laminate film, a film formed by laminating a metal foil and a polymer film is generally used. Specifically, a three-layer film composed of an outer layer polymer film/a metal foil/an inner layer polymer film is exemplified. The outer layer polymer film is for preventing the metal foil from being damaged due to permeation of moisture and the like, contact, and the like, and polymers, such as polyamide and polyester, can be suitably used. The metal foil is for preventing permeation of moisture and gas, and foil of copper, aluminum, stainless steel, or the like can be suitably used. The inner layer polymer film protects the metal foil from the electrolyte contained in the inside and is for melting and sealing at the time of heat sealing, and polyolefin or acid-modified polyolefin can be suitably used.

[Secondary Battery of the Present Invention]

The secondary battery according to one embodiment of the present invention will be described hereinafter in consideration of the basic configuration of the secondary battery described above. It is to be noted in advance that the secondary battery according to one embodiment of the present invention is assumed to be a secondary battery having a step structure.

Figure 1:
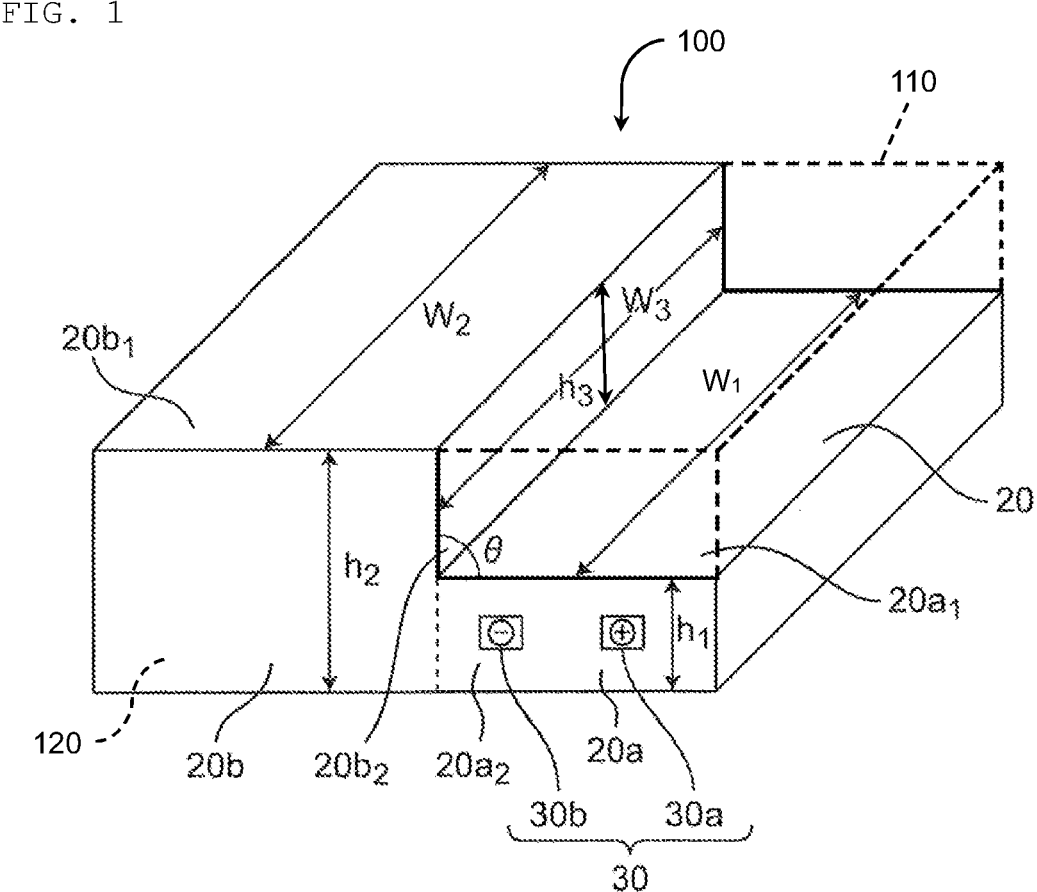
FIG. 1 is a perspective view schematically showing a secondary battery according to one embodiment of the present invention.

FIG. 1 is a perspective view schematically showing the secondary battery according to one embodiment of the present invention.

A secondary battery 100 according to one embodiment of the present invention has a structure in which an electrode assembly and an electrolyte 120 are accommodated and sealed in an exterior body 20. The exterior body 20 is provided with at least two step portions which are continuous with each other and have top surfaces at height levels different from each other. For example, as an example, as shown in FIG. 1, the exterior body 20 may include at least two step portions (a first step portion 20a and a second step portion 20b). Specifically, the first step portion 20a and the second step portion 20b are continuous to each other, and a height h2 of a top surface 20b1 of the second step portion 20b is larger than a height h1 of a top surface 20a1 of the first step portion 20a. The height level of the top surface 20a1 of the first step portion 20a and the height level of the top surface 20b1 of the second step portion 20b are different from each other, so that a step surface 20b2 is formed between the top surface 20a1 of the first step portion 20a and the top surface 20b1 of the second step portion 20b. On the other hand, in one embodiment, the first step portion 20a and the second step portion 20b are configured so that a width dimension W2 (longitudinal direction) of the top surface 20b1 of the second step portion 20b is equal to a width dimension W1 (longitudinal direction) of the top surface 20a1 of the first step portion 20a.

A step surface $20b_2$ has a height $h_3$ and a width dimension (longitudinal direction) $W_3$. The height $h_3$ of the step surface $20b_2$ is equal to a difference between the height $h_2$ of the top surface $20b_1$ of the second step portion 20b and the height h1 of the top surface $20a_1$ of the first step portion 20a. On the other hand, the width $W_3$ (longitudinal direction) of the step surface $20b_2$ is equal to the width dimension $W_2$ (longitudinal direction) of the top surface $20b_1$ of the second step portion 20b and the width dimension $W_1$ (longitudinal direction) of the top surface $20a_1$ of the first step portion 20a.

The step surface $20b_2$ is configured to be continuous with the top surface $20a_1$ of the first step portion 20a. Specifically, the top surface $20a_1$ of the first step portion 20a is continuous with the step surface $20b_2$ in a manner extending in a direction different from an extending direction of the step surface $20b_2$.

Although not particularly limited, the top surface $20a_1$ of the first step portion 20a may extend in a direction perpendicular to the extending direction of the step surface $20b_2$. That is, an angle θ between the step surface $20b_2$ and the top surface $20a_1$ of the first step portion 20a may be 90 degrees. Note that the configuration is not limited to the above, and the angle θ between the step surface $20b_2$ and the top surface $20a_1$ of the first step portion 20a may be 30 to 150 degrees in consideration of an arrangement form of a substrate, and is preferably 50 to 130 degrees, and more preferably 70 to 110 degrees.

In this manner, the exterior body has a step structure formed between the step surface and the top surface 20a1 of the first step portion 20a. A substrate 110 is preferably provided in the step structure, specifically a spatial region on the top surface 20a1 of the first step portion 20a from the viewpoint of efficient utilization of the region.

Note that the above-mentioned substrate may be what is called a rigid substrate or a flexible substrate, and is preferably a rigid substrate. As the rigid substrate, any rigid substrate used in the field of substrates used together with a secondary battery can be used, and, for example, a glass-epoxy resin substrate can be mentioned. Examples of the substrate include circuit boards, such as a printed circuit board and a protective circuit board, a semiconductor substrate, such as a silicon wafer, a glass substrate, such as a display panel, and the like. When the substrate is what is called a protective circuit board for preventing overcharge, overdischarge, and overcurrent of the secondary battery, a secondary battery pack is configured with the protective circuit board and the secondary battery.

Further, external terminals 30 (a positive electrode external terminal 30a and a negative electrode external terminal 30b) for a secondary battery are provided on a surface of the exterior body 20. Although not particularly limited, for example, the external terminal 30 may be configured to be exposed on an end portion side surface $20a_2$ of the first step portion 20a.

Hereinafter, an electrode assembly which is a constituent of the secondary battery according to one embodiment of the present invention will be described.

As described above, the exterior body which is a constituent of the secondary battery according to one embodiment of the present invention has at least two step portions (a low step portion having a top surface at a relatively low position and a high step portion having a top surface, which is continuous with the low step portion and at a relatively high position). Since the top surface of the low step portion and the top surface of the high step portion are at height levels different from each other, a step surface is formed between the top surface of the low step portion and the top surface of the high step portion due to the difference. In this manner, the exterior body has a step structure formed between the step surface and the top surface of the low step portion. In one embodiment of the present invention, from the viewpoint of preventing movement (displacement) of the electrode assembly in the exterior body and the like, the electrode assembly disposed in the exterior body having the step structure preferably has a step structure having substantially the same shape as the exterior body in a cross-sectional view.

Note that the content of description below is merely an example, and it is confirmed that the electrode assembly is presumed to be provided inside the exterior body having two step portions.

The electrode assembly, which is a constituent of the secondary battery, includes a positive electrode, a negative electrode, and a separator disposed between the positive electrode and the negative electrode as described above. Types of the electrode assembly include those described below. In a first type (planar lamination structure type), the electrode assembly 10A is formed by laminating a plurality of unit electrode units including the positive electrodes 1, 1A, the negative electrodes 2, 2A and the separators 3, 3A (see FIG. 9), and in a second type (wound structure type), the electrode assembly 10B is formed by winding an electrode unit including a positive electrode 1, 1B, a negative electrode 2, 2B and a separator 3, 3B in a roll form (see FIG. 10). Furthermore, as a third type, the electrode assembly may have what is called a stack-and-fold structure that is formed by folding an electrode unit of a positive electrode, a negative electrode, a separator, and a negative electrode (particularly preferably an electrode unit (a laminate body) extending longer in one direction).

Figure 2:
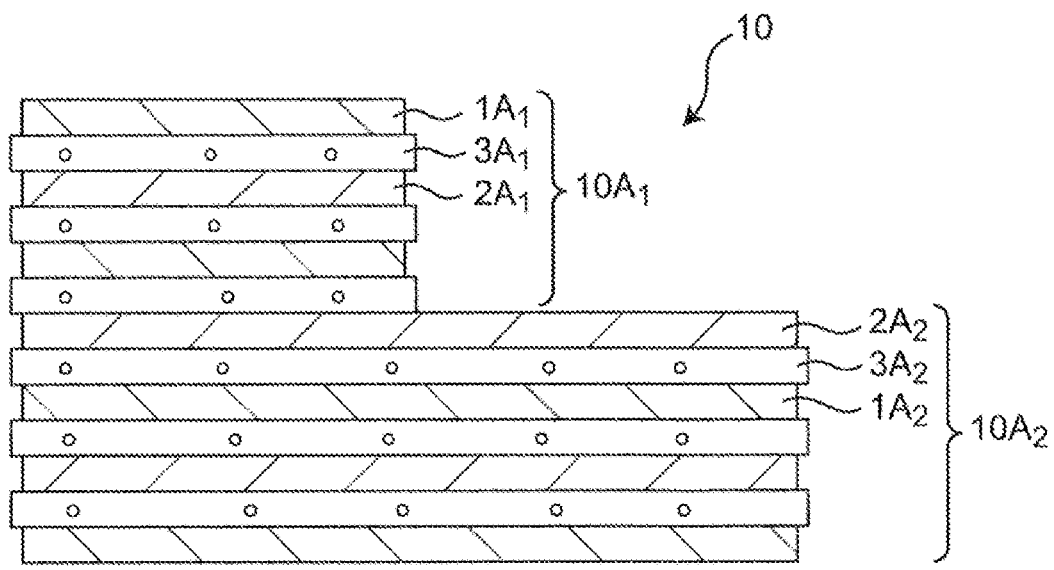
FIG. 2 is a cross-sectional view schematically showing an electrode assembly having a step structure of one mode.

In one mode, the electrode assembly 10 may include at least two sub-electrode assemblies of planar lamination structure type (see FIG. 2). For example, the electrode assembly 10 may include a first planar lamination structure type sub electrode assembly $10A_1$ and a second planar lamination structure type sub electrode assembly $10A_2$. The first planar lamination structure type sub electrode assembly $10A_1$ is formed by laminating a plurality of unit electrode units including a positive electrode $1A_1$, a negative electrode $2A_1$, and a separator $3A_1$. Similarly, the second planar lamination structure type sub electrode assembly $10A_2$ is formed by laminating a plurality of unit electrode units including a positive electrode $1A_2$, a negative electrode $2A_2$, and a separator $3A_2$.

In this case, for example, in the electrode assembly 10, the second planar lamination structure type sub electrode assembly $10A_2$ has a width dimension larger than a width dimension of the first planar lamination structure type sub electrode assembly $10A_1$ in a cross-sectional view as shown in FIG. 2, and may be mutually in contact with the first planar lamination structure type sub electrode assembly $10A_1$ in such as manner as being positioned below the first planar lamination structure type sub electrode assembly $10A_1$. By having such a structure, the electrode assembly 10 may have a step structure in the cross-sectional view.

Hereinafter, the electrode assembly which is a constituent of the secondary battery according to one embodiment of the present invention will be described based on the premise that it has a step structure in a cross-sectional view. Note that, hereinafter, the term "connecting tab" referred to in the present description means a portion corresponding to an uncoated portion of an electrode (positive electrode/negative electrode) and not joined to a current collector lead. The term "connecting portion" as used in the present description means one in which each of a plurality of connecting tabs can be connected to each other. The term "extended tab" in the present description means a portion corresponding to an uncoated portion of an electrode (positive electrode/negative electrode) and joined to a current collector lead. Further, the term "extended portion" as used in the present description is one in which each of a plurality of extended tabs can be connected to each other.

Figure 3:
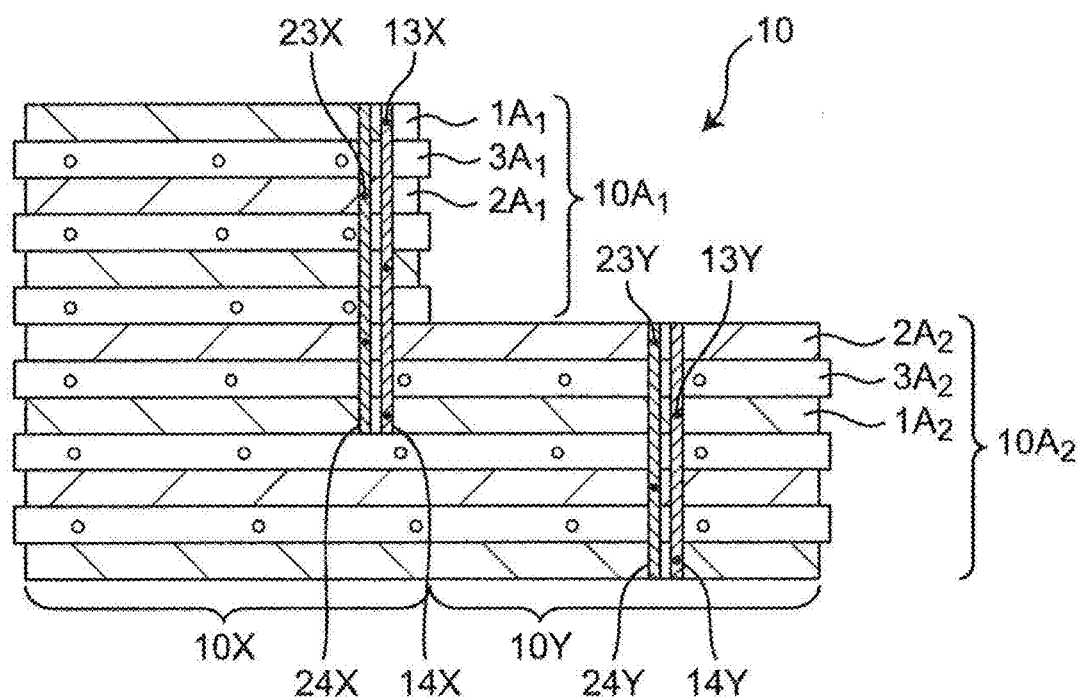
FIG. 3 is a cross-sectional view schematically showing a mode in which a positive electrode side extended tab and/or a negative electrode side extended tab positioned in a second region of the electrode assembly are electrically connected to an external terminal.

In such a case, in one embodiment of the present invention, the electrode assembly 10 having the step structure has a first region 10X (constituent of the electrode assembly 10) being relatively high and a second region 10Y (constituent of the electrode assembly 10) being relatively low adjacent to the first region 10X in a cross-sectional view as shown in FIG. 3. The term "adjacent" as used here may include not only a state in which the first region 10X and the second region 10Y are continuous and which are constituents of a single electrode assembly, but also a state in which one electrode assembly (corresponding to the first region) and the other electrode assembly (corresponding to the second region) functioning as separate constituent bodies are continuous. In other words, from the viewpoint that the electrode assembly 10 including the first region 10X and the second region 10Y can be electrically connected as a whole, each of the positive electrode and the negative electrode in the second region 10Y and each of the positive electrode and the negative electrode in the first region 10X may be configured to be adjacent to each other.

Figure 4:
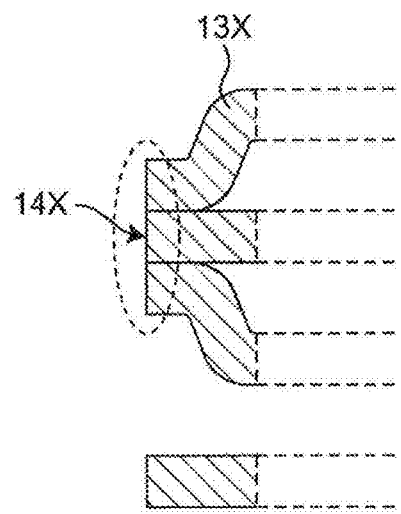
FIG. 4 is a cross-sectional view schematically showing a mode of a positive electrode side connecting portion which mutually connects positive electrode side connecting tabs positioned in a first region of the electrode assembly.

In one embodiment of the present invention, each of positive electrode side connecting tabs 13X included in each of "part" of a plurality of positive electrodes configured with the positive electrode 1A$_1$ of the first planar lamination structure type sub electrode assembly 10A$_1$ in the first region 10X and the positive electrode 1A$_2$ of the second planar lamination structure type sub electrode assembly 10A$_2$ in the first region 10X, so that a positive electrode side connecting portion 14X is formed as shown in FIG. 3. Specifically, for example, as shown in FIG. 4, the positive electrode side connecting portion 14X is formed by joining end portions of a plurality of the positive electrode side connecting tabs 13X so as to form a bundle as a whole. A joining method is not particularly limited, but laser welding, ultrasonic welding, and the like can be mentioned.

Figure 5:
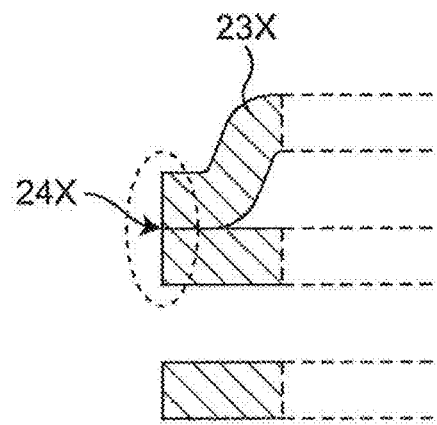
FIG. 5 is a cross-sectional view schematically showing a mode of a negative electrode side connecting portion which mutually connects negative electrode side connecting tabs positioned in the first region of the electrode assembly.

Similarly, in one embodiment of the present invention, each of negative electrode side connecting tabs 23X included in each of "part" of a plurality of negative electrodes configured with the negative electrode 2A$_1$ of the first planar lamination structure type sub electrode assembly 10A$_1$ positioned in the first region 10X and the negative electrode 2A$_2$ of the second planar lamination structure type sub electrode assembly 10A$_2$, so that a negative electrode side connecting portion 24X is formed as shown in FIG. 3. Specifically, for example, as shown in FIG. 5, the negative electrode side connecting portion 24X is formed by joining end portions of a plurality of the negative electrode side connecting tabs 23X so as to form a bundle as a whole. A joining method is not particularly limited, but laser welding, ultrasonic welding, and the like can be mentioned.

Figure 6:
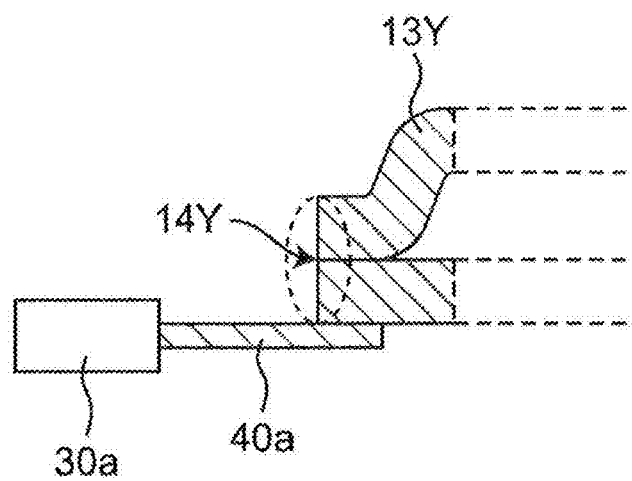
FIG. 6 is a cross-sectional view schematically showing a mode of a positive electrode side extended portion which mutually connects the positive electrode side extended tabs positioned in the second region of the electrode assembly.

On the other hand, in one embodiment of the present invention, as shown in FIG. 3, the positive electrode side extended portion 14Y is formed by mutually joining the positive side extended tabs 13Y of at least two positive electrodes in the second region 10Y, for example, the positive electrode 1A$_2$ of the second planar lamination structure type sub electrode assembly 10A$_2$. Specifically, for example, as shown in FIG. 6, the positive electrode side extended portion 14Y is formed by joining end portions of the positive electrode side extended tabs 13Y so as to form a bundle as a whole. A joining method is not particularly limited, but laser welding, ultrasonic welding, and the like can be mentioned.

In one mode, part of the positive electrode side extended tab 13Y in the formation region of the positive electrode side extended portion 14Y may be configured to be electrically connected to the external terminal 30a via the positive electrode side current collector lead 40a. For example, part of the positive electrode side extended tab 13Y in the formation region of the positive electrode side extended portion 14Y may be electrically connected to the external terminal 30a "provided on the end portion side surface 20a$_2$ of the first step portion 20a" via the positive electrode side current collector lead 40a. Note that the configuration is not limited to the above, and on the premise that the positive electrode side extended portion 14Y is formed, part of the positive electrode side extended tab 13Y in another region other than the formation region of the positive electrode side extended portion 14Y may be configured to be electrically connected to the external terminal 30a via the positive electrode side current collector lead 40a. Further, part of the positive electrode side extended tab 13Y is not limited to be connected to the external terminal 30a with the positive electrode side current collector lead 40a interposed between them. For example, part of the positive electrode side extended tab 13Y may be connected to the positive electrode side current collector lead having the function of the external terminal.

Figure 7:
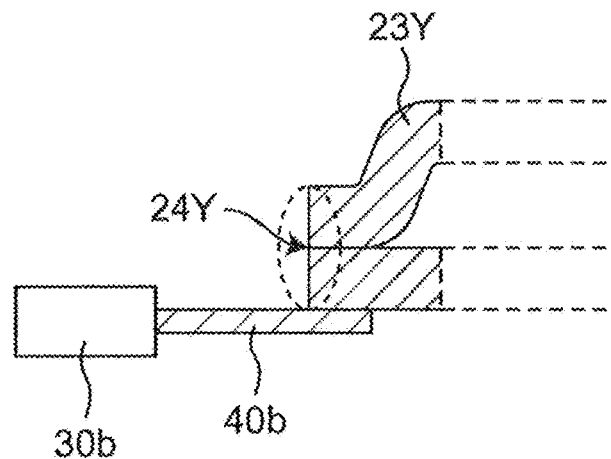
FIG. 7 is a cross-sectional view schematically showing a mode of a negative electrode side extended portion which mutually connects the negative electrode side extended tabs positioned in the second region of the electrode assembly.

Similarly, as shown in FIG. 3, the negative electrode side extended portion 24Y may be formed by mutually joining the negative side extended tabs 23Y of at least two negative electrodes in the second region 10Y, for example, the negative electrode 2A$_2$ of the second planar lamination structure type sub electrode assembly 10A$_2$. Specifically, for example, as shown in FIG. 7, the negative electrode side extended portion 24Y is formed by joining end portions of the negative electrode side extended tabs 23Y so as to form a bundle as a whole. A joining method is not particularly limited, but laser welding, ultrasonic welding, and the like can be mentioned.

In one mode, part of the negative electrode side extended tab 23Y in the formation region of the negative electrode side extended portion 24Y may be configured to be electrically connected to the external terminal 30b via the negative electrode side current collector lead 40b. For example, part of the negative electrode side extended tab 23Y in the formation region of the negative electrode side extended portion 24Y may be electrically connected to the external terminal 30b "provided on the end portion side surface 20a$_2$ of the first step portion 20a" via the negative electrode side current collector lead 40b. Note that the configuration is not limited to the above, and on the premise that the negative electrode side extended portion 24Y is formed, part of the negative electrode side extended tab 23Y in another region other than the formation region of the negative electrode side extended portion 24Y may be configured to be electrically connected to the external terminal 30b via the negative electrode side current collector lead 40b. Further, part of the negative electrode side extended tab 23Y is not limited to be connected to the external terminal 30b with the negative electrode side current collector lead 40b interposed between them. For example, part of the negative electrode side extended tab 23Y may be connected to the negative electrode side current collector lead having the function of the external terminal.

Note that, as shown in FIG. 3, from the viewpoint of enabling the electrode assembly 10 to be electrically connected as a whole, at least one of the positive electrodes $1A_2$ positioned in the second region 10Y needs to be configured to be mutually electrically connected to at least one of the positive electrodes $1A_1$ positioned in the first region 10X. To put it briefly, from the viewpoint of enabling the electrode assembly 10 to be electrically connected as a whole, at least one positive electrode needs to include both the positive electrode side connecting tab 13X and the positive electrode side extended tab 13Y in the plan view. Similarly, as shown in FIG. 3, from the viewpoint of enabling the electrode assembly 10 to be electrically conductive as a whole, at least one of the negative electrodes $2A_2$ positioned in the second region 10Y needs to be configured to be mutually electrically connected to at least one of the negative electrodes $2A_1$ positioned in the first region 10X. To put it briefly, from the viewpoint of enabling the electrode assembly 10 to be electrically conductive as a whole, at least one negative electrode needs to include both the negative electrode side connecting tab 23X and the negative electrode side extended tab 23Y in the plan view.

In one embodiment of the present invention, as shown in FIG. 6, the positive electrode side extended portion 14Y in the second region 10Y may be electrically connected to the external terminal 30a via the positive electrode side current collector lead 40a. Further, as shown in FIG. 7, the negative electrode side extended portion 24Y in the second region 10Y may be electrically connected to the external terminal 30b via the negative electrode side current collector lead 40b. By employing such a configuration, an external terminal electrically connected to the extended tab via the current collector lead does not always need to be provided on the second step portion 20b side of the exterior body 20. In other words, even if part of a plurality of positive electrodes are connected to each other with the positive electrode side connecting tab 13X interposed between them by formation of the positive electrode side connecting portion 14X in the first region 10X, and part of a plurality of negative electrodes are connected to each other with the negative electrode side connecting tab 23X interposed between them by formation of the negative electrode side connecting portion 24X in the first region 10X, the external terminal may be provided not on the second step portion 20b side of the exterior body 20 but on the first step portion 20a side. In view of the above, according to one embodiment of the present invention, it is possible to prevent an installation location of the external terminal from being limited to the second step portion 20b side of the exterior body 20. That is, according to one embodiment of the present invention, the degree of freedom of installation of the external terminal can be increased.

As shown in FIG. 6 and FIG. 7, in the present mode, the positive electrode side extended tab 13Y of at least two of the positive electrodes $1A_2$ in the second region 10Y is electrically connected to the external terminal 30a via the positive electrode side extended portion 14Y, therefore it is possible to suppress the concentration of electric resistance on one positive electrode compared to a case where only a single one of the positive electrodes $1A_2$ is electrically connected to the external terminal 30a in the second region 10Y. Further, similarly, as shown in FIG. 6 and FIG. 7, in the present mode, the negative electrode side extended tab 23Y of at least two of the negative electrodes $2A_2$ in the second region 10Y is electrically connected to the external terminal 30b via the negative electrode side extended portion 24Y, therefore it is possible to suppress the concentration of electric resistance on one positive electrode compared to a case where only a single one of the negative electrodes $2A_2$ is electrically connected to the external terminal 30b in the second region 10Y. From the above, it is possible to relatively reduce the electric resistance generated in the secondary battery 100 according to one embodiment of the present invention as a whole.

For example, as shown in FIG. 1 and FIG. 6, when the positive electrode side extended tab 13Y may be electrically connected to a single positive electrode side external terminal 30a via the positive electrode side current collector lead 40a, the number of wires connecting the positive side external terminal 30a and the substrate can also be set to only one. Therefore, it is possible to suppress the complication of a wiring structure which may occur when a plurality of positive electrode side external terminals are used. In other words, the wire structure connecting the positive electrode side external terminal 30a and the substrate can be simplified. Similarly, for example, as shown in FIG. 1 and FIG. 7, when the negative electrode side extended tab 23Y may be electrically connected to a single negative electrode side external terminal 30b via the negative electrode side current collector lead 40b, the number of wires connecting the negative side external terminal 30b and the substrate can also be set to only one. Therefore, it is possible to suppress the complication of a wiring structure which may occur when a plurality of negative electrode side external terminals are used. In other words, the wiring structure connecting the negative electrode side external terminal 30b and the substrate can be simplified.

In one mode, as shown in FIGS. 1 and 6, the positive electrode side connecting portion 14X and the negative electrode side connecting portion 24X, and the positive electrode side extended portion 14Y and the negative electrode side extended portion 24Y are preferably configured to be arranged only on one side in the exterior body 20.

When such a configuration is employed, as compared with a case where, for example, the positive electrode side connecting portion 14X and the positive electrode side extended portion 14Y are arranged on one side of the electrode assembly 10, and the negative electrode side connecting portion 24X and the negative electrode side extended portion 24Y are disposed on the other side facing the one side of the electrode assembly 10, a width dimension of the electrode assembly 10 can be relatively reduced in the plan view due to that, for example, the negative electrode side connecting portion 24X and the negative electrode side extended portion 24Y do not exist on the other side of the electrode assembly 10. Therefore, due to the relative reduction of the width dimension of the electrode assembly 10, it is possible to relatively reduce dimensions of the exterior body 20 accommodating the electrode assembly 10 therein. That is, dimensions of the secondary battery 100 according to one embodiment of the present invention can be made relatively small.

Further, the configuration is not limited to the mode described above and, for example, instead of the second region 10Y of the electrode assembly 10 electrically connected to an external terminal, in the first region 10X not electrically connected to the external terminal, all the positive electrodes may be connected to each other with each of the positive electrode side connecting tabs 13X interposed between them by formation of the positive electrode side connecting portion 14X, and all the negative electrodes may be connected to each other with the negative electrode side connecting tabs 23X interposed between them by formation of the negative electrode side connecting portion 24X. In this case, since all the positive electrodes are mutually connected by the single positive electrode side connecting portion 14X, the electrical connection between the positive electrodes can be stabilized. Further, since all of the negative electrodes are mutually connected by the single negative electrode side connecting portion 24X, the electrical connection between the negative electrodes can be stabilized. In this case, it is possible to stably generate a cell reaction in all the electrodes, so that the battery characteristics may be further improved.

Note that the above description is made based on the electrode assembly 10 including the first planar lamination structure type sub electrode assembly 10A$_1$ and the second planar lamination structure type sub electrode assembly 10A$_2$. However, the present invention is not limited to the above, and a mode described below may be employed if the electrode assembly has a step structure in the cross-sectional view.

Figure 8:
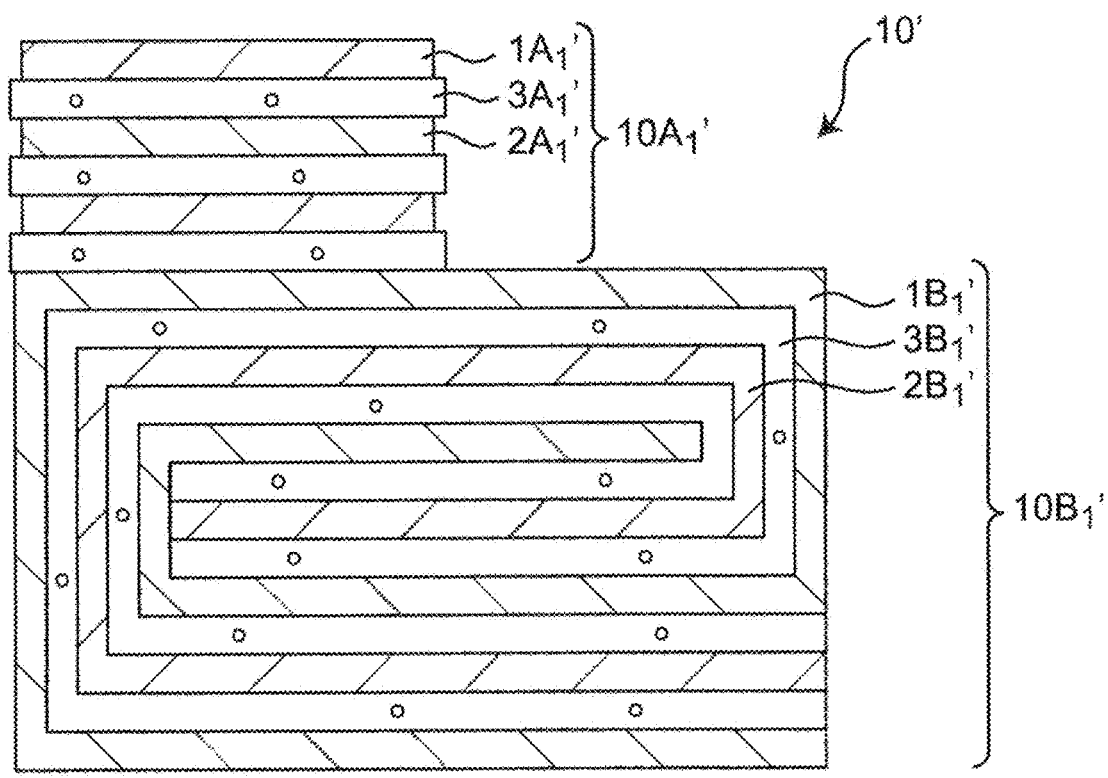
FIG. 8 is a cross-sectional view schematically showing the electrode assembly having a step structure of another mode.

For example, as shown in FIG. 8, a configuration of an electrode assembly 10' including a planar lamination structure type sub electrode assembly and a wound structure type sub electrode assembly may be employed. A planar lamination structure type sub electrode assembly 10A$_1$' is formed by laminating a plurality of unit electrode units including a positive electrode 1A$_1$', a negative electrode 2A$_1$', and a separator 3A$_1$'. On the other hand, a wound structure type sub electrode assembly 10B$_1$' is an electrode unit including the positive electrode 1B$_1$', the negative electrode 2B$_1$' and the separator 3B$_1$' wound in a roll. In this case, for example, in the electrode assembly 10', the wound structure type sub electrode assembly 10B$_1$ has a width dimension larger than a width dimension the planar lamination structure type sub electrode assembly 10A$_1$ in the cross-sectional view as shown in FIG. 8, and may be mutually in contact with the planar lamination structure type sub electrode assembly 10A$_1$ in such a manner as being positioned below the planar lamination structure type sub electrode assembly 10A$_1$.

The configuration is not limited to the above, and, in still another mode, the planar laminate structure type sub electrode assembly has a width dimension larger than the width dimension of the wound structure type sub electrode assembly in the cross-sectional view, and may be in contact with the wound structure type sub electrode assembly in such a manner as being positioned below the wound structure type sub electrode assembly.

In yet another mode, the electrode assembly may include at least two wound structure type sub electrode assemblies (not shown). For example, the electrode assembly may include a first wound structure type sub electrode assembly and a second wound structure type sub electrode assembly. Both of the first wound structure type sub electrode assembly and the second wound structure type sub electrode assembly are formed by winding an electrode unit including a positive electrode, a negative electrode, and a separator in a roll. In this case, for example, in the electrode assembly, the second wound structure type sub electrode assembly has a width dimension larger than a width dimension of the first wound structure type sub electrode assembly in the cross-sectional view, and may be mutually in contact with the first wound structure type sub electrode assembly in such a manner as being positioned below the first wound structure type sub electrode assembly.

Note that, although detailed description, which overlaps the content described in the mode (see FIG. 3) in which at least two planar lamination structure type sub electrode assemblies are included, is avoided, if the electrode assembly has a step structure in the cross-sectional view, a characteristic configuration is preferably employed from two viewpoints described below also in the mode (see FIG. 8) in which the electrode assembly includes at least the planar lamination structure type sub electrode assembly and the wound structure type sub electrode assembly. Specifically, in this mode as well, from the viewpoint of "avoiding that the installation location of the external terminal is limited to the second step portion 20b side of the exterior body 20, thereby increasing the degree of freedom in installation of the external terminal", a configuration described below is preferably employed.

Specifically, the positive electrode side connecting tabs included in the positive electrodes configured with the positive electrode 1A$_1$' of the planar lamination structure type sub electrode assembly 10A$_1$' in the first region being relatively high of the electrode assembly 10' in the cross-sectional view and the positive electrode 1B$_1$' of the wound structure type sub electrode assembly 10B$_1$' in the first region are preferably connected to each other by formation of the positive electrode side connecting portion. Further, at the same time, the positive electrode side extended tab included in the positive electrode 1B$_1$' of the wound structure type sub electrode assembly 10B$_1$' in the second region being relatively low of the electrode assembly 10' is preferably electrically connected to the positive electrode side external terminal 30a (see FIG. 1, for example) via the positive electrode side current collector lead. Similarly, the negative electrode side connecting tabs included in the negative electrodes configured with the negative electrode 2A$_1$' of the planar lamination structure type sub electrode assembly 10A$_1$' in the first region being relatively high of the electrode assembly 10' in the cross-sectional view and the negative electrode 2B$_1$' of the wound structure type sub electrode assembly 10B$_1$' in the first region are preferably connected to each other by formation of the negative electrode side connecting portion. Further, at the same time, the negative electrode side extended tab included in the negative electrode 2B$_1$' of the wound structure type sub electrode assembly 10B$_1$' in the second region being relatively low of the electrode assembly 10' is preferably electrically connected to the negative electrode side external terminal 30b (see FIG. 1, for example) via the negative electrode side current collector lead.

Similarly, from the above viewpoint, a characteristic configuration is preferably employed also in a mode (not shown) in which the electrode assembly includes at least two wound structure type sub electrode assemblies in which width dimensions are different from each other in the cross-sectional view. Specifically, the positive electrode side connecting tabs included in the positive electrodes configured with the positive electrode of the first wound structure type sub electrode assembly in the first region being relatively high of the electrode assembly in the cross-sectional view and the positive electrode of the second wound structure type sub electrode assembly in the first region are preferably connected to each other by formation of the positive electrode side connecting portion. Further, at the same time, the positive electrode side extended tab included in the positive electrode of the second wound structure type sub electrode assembly in the second region being relatively low of the electrode assembly is preferably electrically connected to the positive electrode side external terminal 30a (see FIG. 1, for example) via the positive electrode side current collector lead. Similarly, the negative electrode side connecting tabs included in the negative electrodes configured with the negative electrode of the first wound structure type sub electrode assembly in the first region being relatively high of the electrode assembly in the cross-sectional view and the negative electrode of the second wound structure type sub electrode assembly in the first region are preferably connected to each other by formation of the negative electrode side connecting portion. Further, at the same time, the negative electrode side extended tab included in the negative electrode of the second wound structure type sub electrode assembly in the second region being relatively low of the electrode assembly is preferably electrically connected to the negative electrode side external terminal 30$b$ (see FIG. 1, for example) via the negative electrode side current collector lead.

The secondary battery according to one embodiment of the present invention can be used in various fields in which storage of electricity is expected. Although it is merely an example, the secondary battery according to one embodiment of the present invention, in particular, a non-aqueous electrolyte secondary battery, can be used in the fields of electric, information and communications (for example, mobile equipment fields, such as mobile phones, smart phones, notebook computers, digital cameras, activity meters, arm computers, electronic papers, and the like) in which mobile equipment is used, home and small industrial applications (for example, electric tools, golf carts, domestic, nursing care, and industrial robot fields), large industrial applications (for example, forklifts, elevators, harbor port crane fields), transportation system fields (for example, fields of hybrid vehicles, electric vehicles, buses, trains, electric assisted bicycles, electric motorcycles, and the like), electric power system applications (for example, fields of various electric power generation, load conditioners, smart grids, general home electric storage systems, and the like), IoT fields, space and deep-sea applications (for example, fields of space explorers, research submarines, and the like), and the like.

DESCRIPTION OF REFERENCE SYMBOLS

1: Positive electrode
2: Negative electrode
3: Separator
1A: Positive electrode
2A: Negative electrode
3A: Separator
1$A_1$: Positive electrode
2$A_1$: Negative electrode
3$A_1$: Separator
1$A_1$': Positive electrode
2$A_1$': Negative electrode
3$A_1$': Separator
1$A_2$: Positive electrode
2$A_2$: Negative electrode
3$A_2$: Separator
1B: Positive electrode
2B: Negative electrode
3B: Separator
1$B_1$': Positive electrode
2$B_1$': Negative electrode
3$B_1$': Separator
10: Electrode assembly
10X: First region of the electrode assembly
10Y: Second region of the electrode assembly
10A: Planar lamination structure type electrode assembly
10$A_1$: First planar lamination structure type sub electrode assembly
10$A_1$': Planar lamination structure type sub electrode assembly
10$A_2$: Second planar lamination structure type sub electrode assembly
10$B_1$': Wound structure type sub electrode assembly
11: Positive electrode current collector
12: Positive electrode material layer
13: Positive electrode side extended tab
13X: Positive electrode side connecting tab
13Y: Positive electrode side extended tab
14X: Positive electrode side connecting portion
14$X_1$: First positive electrode side connecting portion
14$X_2$: Second positive electrode side connecting portion
14Y: Positive electrode side extended portion
14$Y_1$: First positive electrode side extended portion
14$Y_2$: Second positive electrode side extended portion
20: Exterior body
20$a$: First step portion of the exterior body
20$a_1$: Top surface of the first step portion
20$a_2$: End portion side surface of the first step portion
20$b$: Second step portion of the exterior body
20$b_1$: Top surface of the second step portion
20$b_2$: Step surface
21: Negative electrode current collector
22: Negative electrode material layer
23: Negative electrode side extended tab
23X: Negative electrode side connecting tab
23Y: Negative electrode side extended tab
24X: Negative electrode side connecting portion
24$X_1$: First negative electrode side connecting portion
24$X_2$: Second negative electrode side connecting portion
24Y: Negative electrode side extended portion
24$Y_1$: First negative electrode side extended portion
24$Y_2$: Second negative electrode side extended portion
30: External terminal
30$a$: Positive electrode side external terminal
30$b$: Negative electrode side external terminal
40$a$: Positive electrode side current collector lead
40$b$: Negative electrode side current collector lead
100: Secondary battery
$W_1$: Width dimension of the top surface of the first step portion
$W_2$: Width dimension of the top surface of the second step portion
$W_3$: Width dimension of the step surface
$h_1$: Height dimension of the top surface of the first step portion
$h_2$: Height dimension of the top surface of the second step portion
$h_3$: Height dimension of the step surface
$\theta$: Angle between the step surface and the top surface of the first step portion

The invention claimed is:

1. A secondary battery comprising:
an exterior body;
an electrode assembly housed in the exterior body, the electrode assembly having an upper surface, a lower surface, and a step structure having a step surface between the upper surface and the lower surface; and
an electrolyte housed in the exterior body,
wherein the electrode assembly includes a plurality of positive electrodes, negative electrodes, and separators disposed between the positive electrodes and the negative electrodes, and the electrode assembly includes a first region having a first cross-sectional height between the upper surface and the lower surface, and a second region adjacent to the first region and having a second cross-sectional height between the step surface and the lower surface, the first cross-sectional height being higher than the second cross-sectional height;

the electrode assembly further including at least one of (1) a positive electrode side connecting portion that mutually connects each of positive electrode side connecting tabs of part of the positive electrodes and located between the upper surface and the lower surface only in the first region and, (2) a negative electrode side connecting portion that mutually connects each of negative electrode side connecting tabs of part of the negative electrodes and located between the upper surface and the lower surface only in the first region; and at least one of (1) a positive electrode side extended portion mutually connecting each of positive electrode side extended tabs of at least two of the positive electrodes and located between the step surface and the lower surface only in the second region, and (2) a negative electrode extended portion mutually connecting each of negative electrode side extended tabs of at least two of the negative electrodes and located between the step surface and the lower surface only in the second region.

2. The secondary battery according to claim 1, wherein the positive electrode side extended portion is configured to be electrically connected to a positive external terminal on a single positive electrode side and the negative electrode side extended portion is configured to be electrically connected to a negative external terminal on a single negative electrode side.

3. The secondary battery according to claim 1, wherein at least one of the positive electrodes includes both the positive electrode side connecting tab and the positive electrode side extended tab, and at least one of the negative electrodes includes both the negative electrode side connecting tab and the negative electrode side extended tab.

4. The secondary battery according to claim 1, wherein the positive electrode side connecting portion and the negative electrode side connecting portion, and the positive electrode side extended portion and the negative electrode side extended portion are arranged on a same side of the exterior body.

5. The secondary battery according to claim 1, wherein
the exterior body comprises at least a first step portion having a first top surface and a second step portion having a second top surface which are continuous with each other and have top surfaces, the first top surface and the second top surface being at different heights, and
an exterior body step surface is located between the first top surface and the second top surface.

6. The secondary battery according to claim 5, wherein the exterior body step surface forms a side surface of the first step portion.

7. The secondary battery according to claim 5, wherein the second top surface of the second step portion is continuous with the exterior body step surface and extends in a direction different from an extending direction of the exterior body step surface.

8. The secondary battery according to claim 5, further comprising an external terminal exposed on a side surface of the second step portion, and
wherein the at least one of the positive electrode side extended portion and the negative electrode side extended portion is configured to be electrically connected to the external terminal.

9. The secondary battery according to claim 1, wherein the electrode assembly has a planar lamination structure in which the positive electrodes, the negative electrodes, and the separators are laminated in a planar shape.

10. The secondary battery according to claim 1, wherein the electrode assembly has a wound structure in which the positive electrodes, the negative electrodes, and the separators are wound into a roll.

11. The secondary battery according to claim 1, wherein
the electrode assembly comprises a combination of a planar lamination structure in which a first set of the positive electrodes, the negative electrodes, and the separators are laminated in a planar shape and wound structure in which a second set of the positive electrodes, the negative electrodes, and the separators are wound into a roll.

12. The secondary battery according to claim 5, further comprising a substrate disposed on the second top surface of the second step portion; and
an external terminal exposed on a side surface of the second step portion, wherein the at least one of the positive electrode side extended portion and the negative electrode side extended portion is configured to be electrically connected to the external terminal, and the external terminal is configured to be electrically connectable to the substrate via a wire.

13. The secondary battery according to claim 12, wherein the substrate is a rigid substrate or a flexible substrate.

14. The secondary battery according to claim 12, wherein the substrate is a protective circuit board.

15. The secondary battery according to claim 1, wherein the positive electrodes and the negative electrodes each have a layer capable of occluding and releasing a lithium ion.

16. A device, comprising:
the secondary battery according to claim 5; and
a substrate disposed on the second top surface of the second step portion.

17. The device according to claim 16, wherein the device is mobile equipment.

* * * * *